United States Patent
Yamamura et al.

(10) Patent No.: US 7,472,039 B2
(45) Date of Patent: Dec. 30, 2008

(54) PROGRAM, APPARATUS, AND METHOD FOR ANALYZING PROCESSING ACTIVITIES OF COMPUTER SYSTEM

(75) Inventors: Shuji Yamamura, Kawasaki (JP); Kouichi Kumon, Kawasaki (JP); Miyuki Ono, Kawasaki (JP); Akira Hirai, Kawasaki (JP); Kazuhiro Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 11/497,295

(22) Filed: Aug. 2, 2006

(65) Prior Publication Data
US 2007/0185688 A1 Aug. 9, 2007

(30) Foreign Application Priority Data
Feb. 8, 2006 (JP) .............................. 2006-030974

(51) Int. Cl.
G06F 11/34 (2006.01)
G06F 17/00 (2006.01)

(52) U.S. Cl. .................. 702/186; 702/178; 702/187; 714/37

(58) Field of Classification Search ................ 702/186, 702/178, 187
See application file for complete search history.

(56) References Cited
U.S. PATENT DOCUMENTS
6,233,678 B1 * 5/2001 Bala ........................... 712/240
6,327,674 B1 * 12/2001 Ito et al. ........................ 714/8
6,408,292 B1 * 6/2002 Bakalash et al. ............... 707/2
7,111,779 B2 * 9/2006 Horikawa et al. ........... 235/380
2005/0216615 A1 * 9/2005 Nakashima et al. ........... 710/22

OTHER PUBLICATIONS

Japanese Patent Application No. 10-063550, Published Mar. 6, 1998, (Abstract only).
Japanese Patent Application No. 05-250339, Published Sep. 28, 1993, (Abstract only).
Japanese Patent Application No. 06-059944, Published Mar. 4, 1994, (Abstract only).
Dong H. Ahn, "Scalable Analysis Techniques for Microprocessor Performance Counter Metrics", Proc. SC 2002, pp. 1-16.

* cited by examiner

Primary Examiner—Hal D Wachsman
(74) Attorney, Agent, or Firm—Staas & Halsey LLP

(57) ABSTRACT

The system provides a technique for detecting changes in behavior of a computer system. An address data storing unit obtains an address being accessed by a CPU at prescribed sampling intervals, stores address data comprising the address and its acquisition time in an address record table in time series. Then an executed process detector detects the name of the process that was executed when the address data was obtained, and sets the process name for the address data in the address record table. When an analysis request specifying an analysis time period is made, an analyzer counts up each of the process names included in the address data being stored in the address record table for each specified analysis time period, and analyzes the breakdown of executed processes for each analysis time period. Then a display unit displays the analysis result of the analyzer.

7 Claims, 13 Drawing Sheets

US 7,472,039 B2

PROGRAM, APPARATUS, AND METHOD FOR ANALYZING PROCESSING ACTIVITIES OF COMPUTER SYSTEM

CROSS-REFERENCE TO RELATED APPLICATIONS

This application is based upon and claims the benefits of priority from the prior Japanese Patent Application No. 2006-030974, filed on Feb. 8, 2006, the entire contents of which are incorporated herein by reference.

BACKGROUND OF THE INVENTION (1) Field of the Invention

This invention relates to a computer-readable recording medium storing a system analysis program, and an apparatus and method for system analysis, for managing a parallel computing system. In particular, this invention relates to a computer-readable recording medium storing a system analysis program, and an apparatus and method for system analysis, in order to detect abnormalities occurring in an operating parallel computing system.

(2) Description of the Related Art

Parallel computing systems are widely employed in many fields including Research and Development (R&D), High Performance Computing (HPC), and bioinformatics. "Parallel computing" is a computing system comprising a plurality of computers being connected over a network. The parallel computing systems include a cluster system and a grid computing system. In this connection, each computer of a parallel computing system is called a node.

Existing parallel computing systems include: (1) "personal computer (PC) cluster system (hereinafter, referred to as cluster)" that comprises a high-speed network and high performance PCs and is designed to mainly execute a single parallel program; and (2) "grid computing system (hereinafter, referred to as grid)" that uses a plurality of computers as one virtual computer according to user-required computing performance and storage capacity.

In such parallel computing systems comprising a great number of computing nodes, "program profiling (which is equivalent to a timer-based sampling or the like and is simply referred to as profiling hereinafter)" is performed for managing the operating conditions of the systems.

Profiling software measures system performance data from start to end of a target program, for example. The system performance data may be measured only during a prescribed time period while the target program runs.

FIG. 13 shows a prior art method of profiling. In FIG. 13, sampling is performed at every 1 ms and an address being accessed by a program at this time is recorded. An address record table 911 is a storage region for storing values indicating how many times addresses are sampled for each function.

The address record table 911 has columns for function name, address range, and sampling count. The function name column stores the names of functions to be executed. The address range column stores ranges of memory addresses to be specified when the functions are executed. The sampling count column stores the number of times where addresses are sampled, in association with the functions.

As can be seen from this example, eight samplings result in obtaining addresses: "0x05", "0x11", "0x13", "0x23", "0x11", "0x23", "0x23", and "0x23". The profiling function detects an address being accessed by a Central Processing Unit (CPU) at sampling. In addition, the profiling function determines based on the address record table 911 which set of function and address range the detected address belongs to. Then the profiling function increments the sampling count corresponding to the function that the detected address belongs to.

As a result, 8-ms sampling results in a sampling count of one for a function "Func A", a sampling count of three for a function "Func B", a sampling count of four for a function "Func C", and a sampling count of zero for a function "Func D". This measurement result shows that the function "Func C" occupied the longest run time (50% of the total time period).

In order to manage a parallel computing system, profiling is performed for each node in a manner shown in FIG. 13. Then a counting process is performed for each node. For example, there is provided a technique for obtaining performance information such as an actual computing time of each of processors composing parallel computers and displaying a circle graph or a radar chart (Japanese Laid-open Patent Publication No. 10-63550).

In addition, a study is made for performing statistical analysis on data of computing nodes in order to extract important features for performance evaluation (refer to Dong H. Ahn and Jeffrey S. Vetter, "Scalable analysis techniques for microprocessor performance counter metrics", Proc.SC 2002).

However, the technique shown in Japanese Laid-open Patent Publication No. 10-63550, when applied to a computing system comprising a plurality of computers, such as cluster or grid, has the following two drawbacks.

1. Since a profiling result is output by taking an entire program as one measurement target, an analyst may miss very small changes in behavior which occurred when the program ran (which occurred in a very short time). This is because their signs are hidden behind all other data. Such changes may deteriorate the system performance in parallel processing.

2. An increased number of profiling data is collected in proportion to the number of computing nodes. Analysis using profiling requires extracting bottleneck processes by inter-comparing the data between the computing nodes. However, it is substantially impossible to perform detailed profiling for thousands of nodes in order to detect very small changes in behavior.

It should be noted that the aforementioned "Dong H. Ahn and Jeffrey S. Vetter" reference does not mention a technique for collecting profiling data. Therefore, this "Dong H. Ahn and Jeffrey S. Vetter" reference does not contribute to solve the above two problems.

SUMMARY OF THE INVENTION

In view of the foregoing, it is an object of the present invention to provide a program, apparatus, and method for analyzing processing activities of a computer system to detect changes in its behavior.

To achieve the above object, there is provided a computer-readable recording medium storing a system analysis program for analyzing processing contents of a computing system. This system analysis program being stored on this recording medium causes a computer to function as: an address data storing unit for obtaining an address being accessed by a central processing unit (CPU) at prescribed sampling intervals, and storing address data including the obtained address and its acquisition time in an address record table in time series; an executed process detector for searching a process-address table for the name of a process that was executed when the address data was obtained, based on the address of the address data being stored in the address record table, and setting the detected name of the process for the address data in the address record table, the process-address table storing the names of processes to be executed by the CPU and memory addresses to be specified by a program when the processes are executed in association with each other; an analyzer for, when receiving an analysis request specifying an analysis time period, counting each of the names of the processes included in the address data being stored in the address record table for each analysis time period, and analyzing the breakdown of the executed processes for each analysis time period; and a display unit for displaying the analysis result of the analyzer.

Further, to achieve the above object, there is provided a system analysis apparatus for analyzing the processing contents of a computing system. This system analyzer comprises: an address data storing unit for obtaining an address being accessed by a central processing unit (CPU) at prescribed sampling intervals, and storing address data including the obtained address and its acquisition time in an address record table in time series; an executed process detector for searching a process-address table for the name of a process that was executed when the address data was obtained, based on the address of the address data being stored in the address record table, and setting the detected name of the process for the address data in the address record table, the process-address table storing the names of processes to be executed by the CPU and memory addresses to be specified by a program when the processes are executed in association with each other; an analyzer for, when receiving an analysis request specifying an analysis time period, counting each of the names of the processes included in the address data being stored in the address record table for each analysis time period, and analyzing the breakdown of the executed processes for each analysis time period; and a display unit for displaying the analysis result of the analyzer.

Still further, to achieve the above object, there is provided a system analysis method which allows a computer to analyze the processing contents of a computing system. According to this system analysis method, an address data storing unit obtains an address being accessed by a central processing unit (CPU) at prescribed sampling intervals, and stores address data including the obtained address and its acquisition time in an address record table in time series. An executed process detector searches a process-address table for the name of a process that was executed when the address data was obtained, based on the address of the address data being stored in the address record table, and sets the detected name of the process for the address data in the address record table, the process-address table storing the names of processes to be executed by the CPU and memory addresses to be specified by a program when the processes are executed in association with each other. An analyzer, when receiving an analysis request specifying an analysis time period, counts each of the names of the processes included in the address data being stored in the address record table for each analysis time period, and analyzes the breakdown of the executed processes for each analysis time period. And a display unit displays the analysis result of the analyzer.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

A preferred embodiment of this invention will be described with reference to the accompanying drawings.

Figure 1:
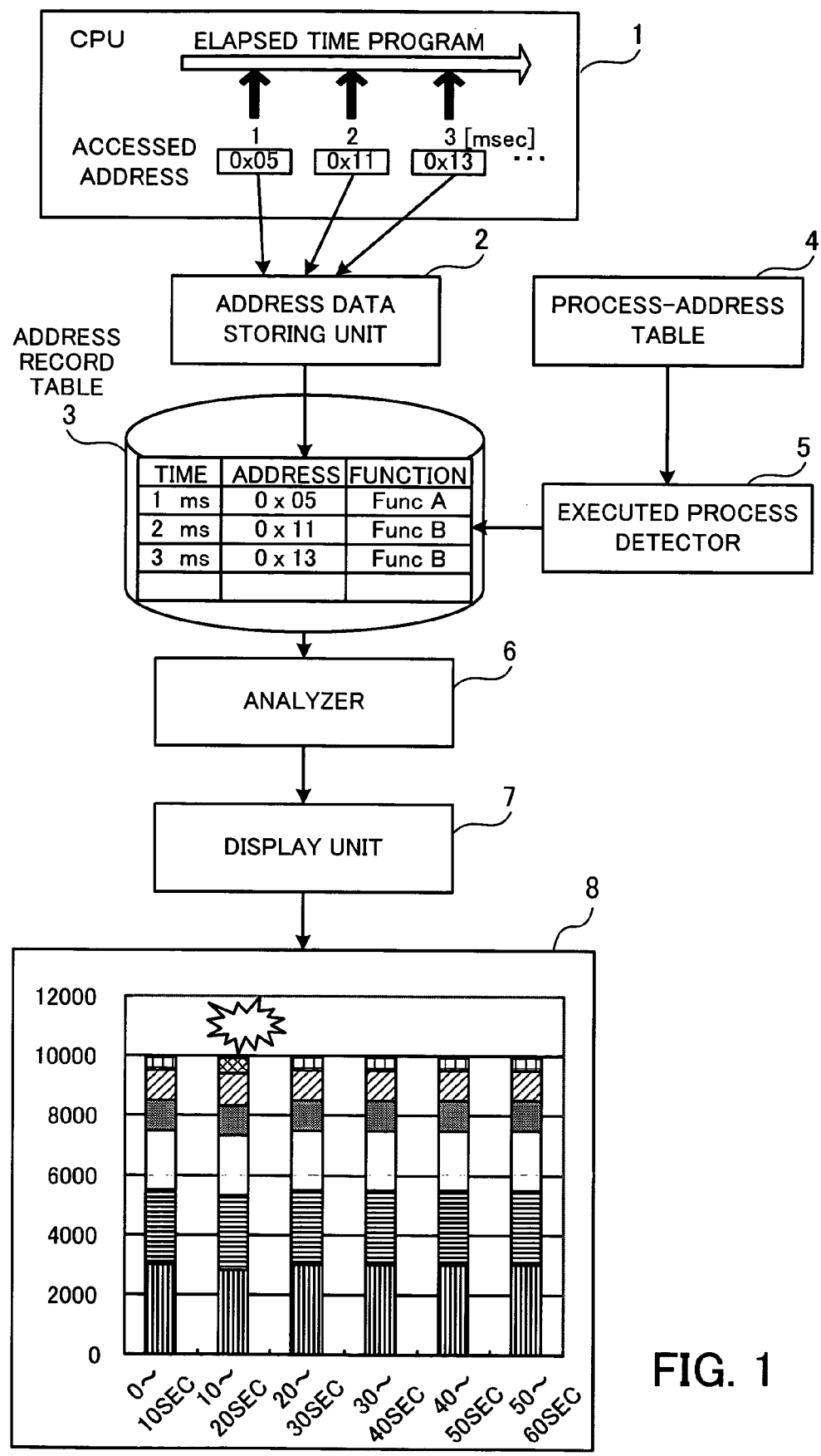
FIG. 1 shows an outline of one embodiment of this invention.

FIG. 1 shows an outline of this embodiment. In order to analyze how processes proceeded for each prescribed analysis time period, this embodiment provides an address data storing unit 2, an address record table 3, a process-address table 4, an executed process detector 5, an analyzer 6, and a display unit 7.

The address data storing unit 2 obtains an address being accessed by a Central Processing Unit (CPU) 1 at prescribed sampling intervals (for example, 1 ms). Then the address data storing unit 2 stores address data comprising the obtained address and its acquisition time in the address record table 3 in time series.

The process-address table 4 stores in advance the names of the processes to be performed by the CPU 1 and memory addresses to be specified in a program when the processes are executed, in association with each other. Specifically, for each function to be executed as one process, the process-address table 4 gives a range of addresses to be specified by the CPU 1 when that function is executed.

Based on the address of each piece of address data stored in the address record table 3, the executed process detector 5 searches the process-address table 4 for the name of a process that was executed when the address data was obtained. Then, the executed process detector 5 sets the detected process name for the address data in the address record table 3.

When the analyzer 6 receives an analysis request specifying an analysis time period (10 seconds, for example), it counts each of the process names included in the address data being stored in the address record table 3 for each specified analysis time period. Then the analyzer 6 analyzes the breakdown of the executed processes for each analysis time period.

The display unit 7 displays an analysis result 8 of the analyzer 6. For example, the display unit 7 displays a bar chart in which each bar shows a ratio of the run times of the executed processes in different colors for each analysis time period.

With such configuration, the address data storing unit 2 obtains an address being accessed by the CPU 1 at prescribed sampling intervals, and stores address data comprising the obtained address and its acquisition time in the address record table 3 in time series. Then the executed process detector 5 detects the name of the process that was executed when the address data was obtained, and sets the detected process name for the address data in the address record table 3.

When an analysis request specifying an analysis time period is made thereafter, the analyzer 6 counts each of the process names included in the address data being stored in the address record table 3 for each analysis time period, and analyzes the breakdown of the executed processes for each analysis time period. The display unit 7 displays the analysis result 8 of the analyzer 6.

As described above, the addresses being accessed by the CPU 1 are obtained and stored in time series, so that the breakdown of the processes executed for each analysis time period can be analyzed. That is, the breakdown of the processing contents for each analysis time period can be confirmed. This allows a profiler to detect abnormalities that may be usually missed. By setting a very short analysis time period, problems occurring in a very short time may be able to be detected.

For the analysis process of the analyzer 6, a process to extract important features for performance evaluation by performing statistical analysis on data of each node, like a process disclosed in the aforementioned "Dong H. Ahn and Jeffrey S. Vetter" reference, can be adapted. Further, the functions shown in FIG. 1 can be used for analyzing a cluster system comprising a great number of nodes. That is, in the cluster system, a combination of the program profiling and the statistics process enables detecting performance bottlenecks and promptly detecting malfunctioning nodes which are caused due to parallelization of a program.

A computer (node) to be tested and a computer which performs analysis may be the same computer or different computers. In a case of analyzing performance of each node in a cluster system, for example, a computer is prepared separate from the nodes composing the cluster system. Now, this embodiment will be specifically described in view of a case where an administration server being connected to a cluster system over a network evaluates and analyzes performance of the cluster system.

Figure 2:
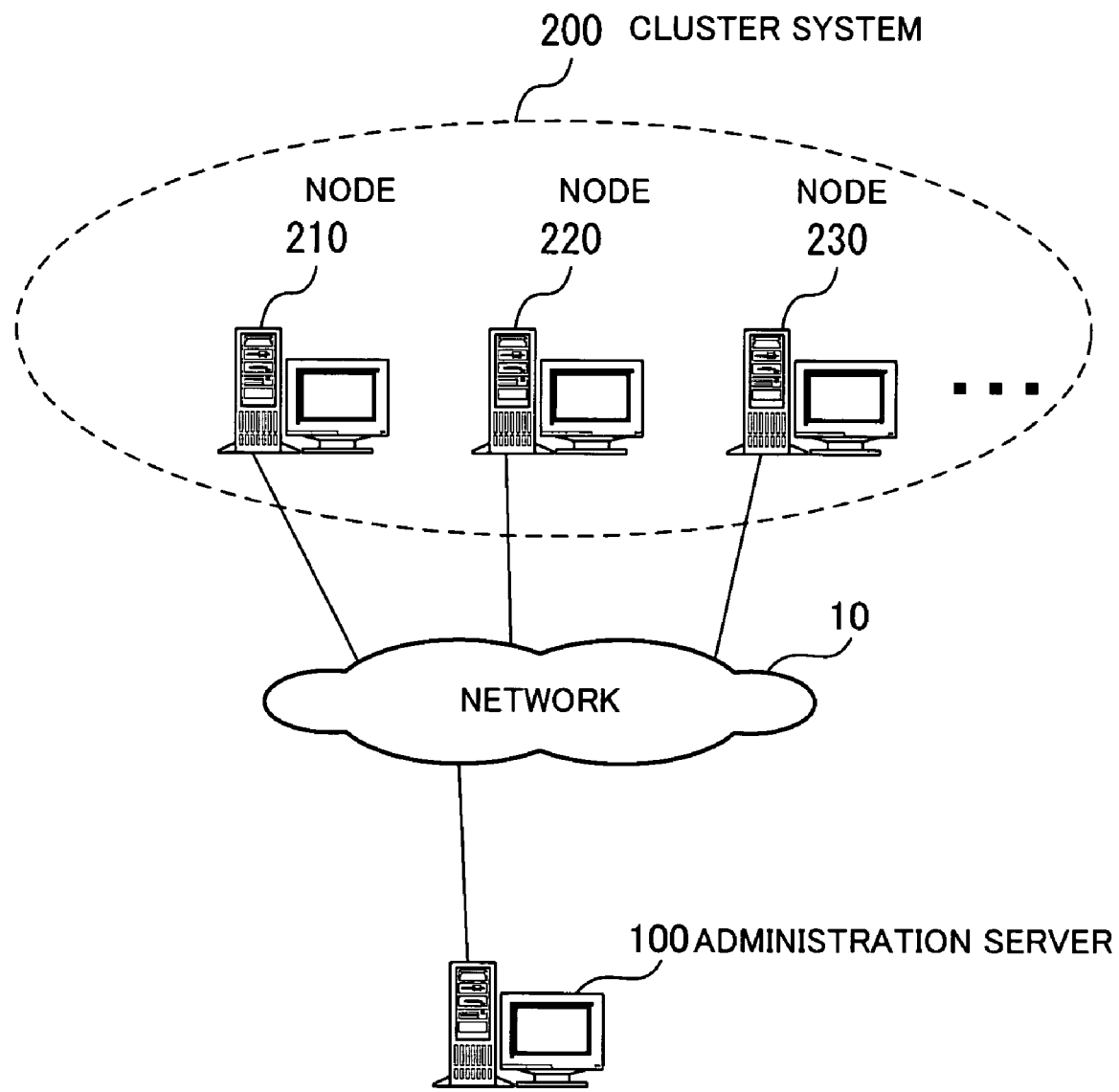
FIG. 2 shows an example of a system configuration of this embodiment.

FIG. 2 shows an example of a system configuration of this embodiment. A cluster system 200 comprises a plurality of nodes 210, 220, 230, . . . The nodes 210, 220, 230, . . . are connected to an administration server 100 over a network 10. The administration server 100 collects performance data from the cluster system 200 to take statistics.

The administration server 100 performs time-series profiling measurement on the great number of nodes 210, 220, 230, . . . Specifically, the administration server 100 collects and automatically analyzes the accessed addresses of all nodes 210, 220, 230, . . .

Figure 3:
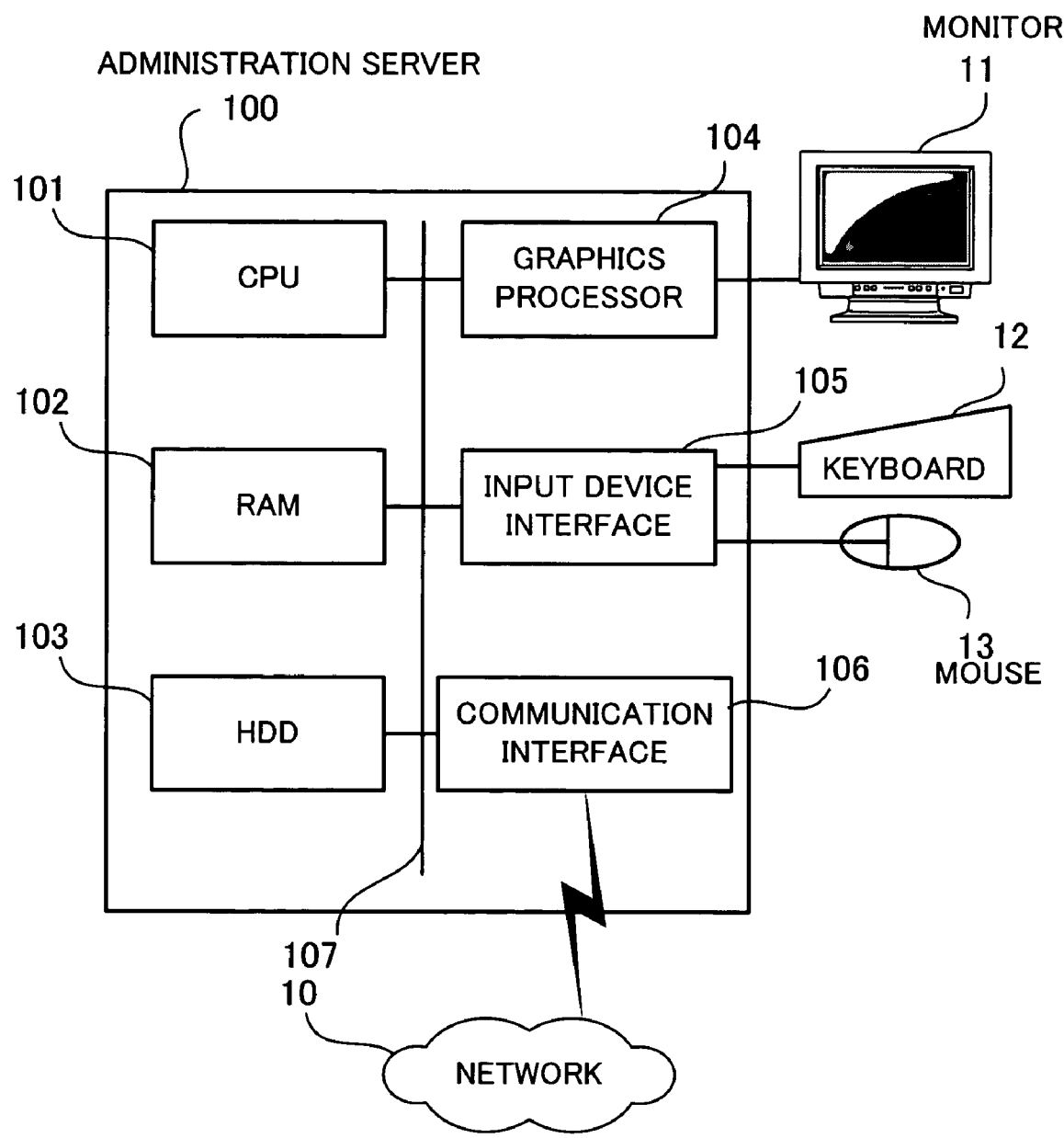
FIG. 3 shows an example of a hardware configuration of an administration server that is employed in this embodiment.

FIG. 3 shows an example of a hardware configuration of an administration server that is employed in this embodiment. The administration server 100 is entirely controlled by a CPU 101. Connected to the CPU 101 via a bus 107 are a Random Access Memory (RAM) 102, a Hard Disk Drive (HDD) 103, a graphics processor 104, an input device interface 105, and a communication interface 106.

The RAM 102 temporarily stores at least part of an Operating System (OS) program and application programs to be executed by the CPU 101. The RAM 102 also stores various kinds of data required for CPU processing. The HDD 103 stores the OS and application programs.

The graphics processor 104 is connected to a monitor 11 to display images on the screen of the monitor 11 under the control of the CPU 101. The input device interface 105 is connected to a keyboard 12 and a mouse 13 and is designed to transfer signals from the keyboard 12 and the mouse 13 to the CPU 101 through the bus 107.

The communication interface 106 is connected to a network 10 to communicate data with other computers over the network 10.

Such hardware configuration enables the processing functions required for this embodiment. The hardware configuration of the administration server 100 shown in FIG. 3 can be applied to the nodes 210, 220, 230, . . . as well.

Figure 4:
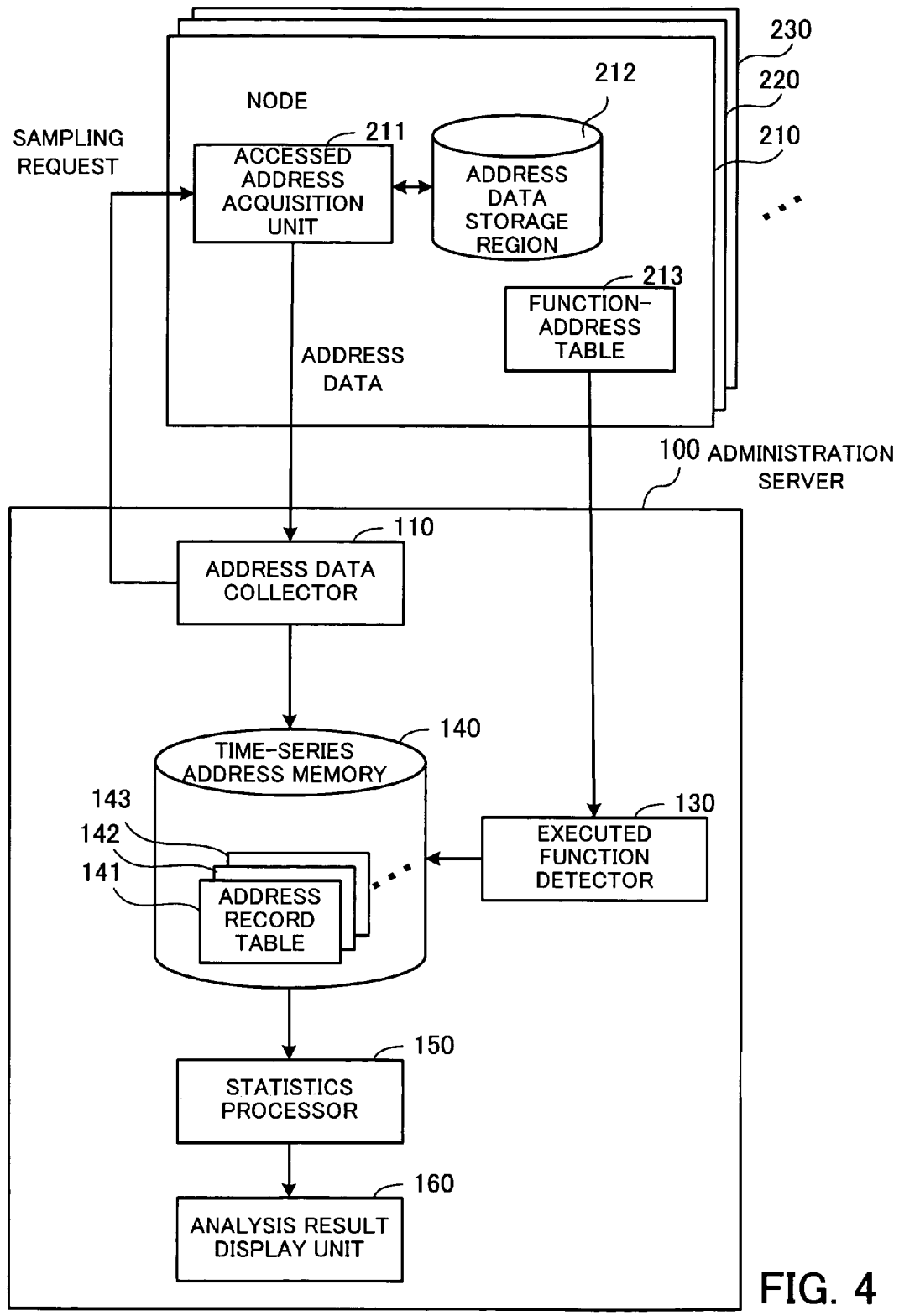
FIG. 4 is a block diagram showing a performance analysis function.

FIG. 4 is a block diagram of the node 210 and the administration server 100, which shows a performance analysis function.

The node 210 has an accessed address acquisition unit 211, an address data storage region 212, and a function-address table 213.

When the accessed address acquisition unit 211 receives a sampling request from the administration server 100, it acquires an address being accessed by the CPU of the node 210 at prescribed sampling intervals during a time period (sampling time period) specified by the sampling request. The sampling request includes information indicating a sampling time period and sampling intervals. An address being accessed by the CPU is a value that is set in a register called a program counter in the CPU.

Specifically, the accessed address acquisition unit 211 creates the address data storage region 212 for recording sampled addresses in time series, in a main memory (RAM). The sampling intervals are 1 ms, for example. The accessed address acquisition unit 211 interrupts the OS of the node 210 at the sampling intervals, so that an OS interruption handler records an address being accessed by the program at this time. Together with the obtained address, the accessed address acquisition unit 211 also records time information (time stamp) indicating its acquisition time.

When the sampling time period has expired, the accessed address acquisition unit 211 exports the contents of the address data storage region 212 of the main memory onto a file in the HDD, and also sends this file to an address data collector 110 of the administration server 100. Then the accessed address acquisition unit 211 stores on the HDD the function-address table 213 (generally called "symbol table file") containing the functions of a program targeted for management in the node 210 and their address ranges.

The address data storage region 212 is a memory region for storing addresses acquired by the accessed address acquisition unit 211 in time series. The function-address table 213 is a data table containing the functions to be executed in the node 210, 220, 230, . . . and address ranges for the functions in association with each other.

The administration server 100 has the address data collector 110, an executed function detector 130, a time-series address memory 140, a statistics processor 150, and an analysis result display unit 160.

The address data collector 110 issues a sampling request to each node 210, 220, 230, . . . in response to user input. In this connection, a sampling time period and sampling intervals that are included in the sampling request are specified by the user. Then, the address data collector 110 collects the address data being stored in the address data memory regions of the nodes 210, 220, 230, ... and records them in corresponding address record tables 141, 142, 143, ... for the nodes in the time-series address memory 140.

Based on each piece of the address data collected by the address data collector 110, the executed function detector 130 searches the function-address table 213 for a function that was executed by the node when the address data was obtained. Then the executed function detector 130 sets identification information of the function corresponding to the address for the address data in the address record table 141, 142, 143, ... . That is, the executed function detector 130 creates a history of functions that were executed in the program in time series by using both the address record table 141, 142, 143, ... and the function-address table 213. Thus created time-series data can be used for the counting process for each prescribed time period.

The time-series address memory 140 is a memory unit for storing correspondence between address data and functions. The time-series address memory 140 contains the address record tables 141, 142, 143, ... for the nodes 210, 220, 230, ... . Each address record table 141, 142, 143, ... stores in time series sets of address data collected from a corresponding node and identification information of a function corresponding to the address data (i.e., stores information on executed functions).

The statistics processor 150 takes statistics on the execution states of the functions based on the executed function information of each node, which is stored in the address record table 141, 142, 143, ... of the time-series address memory 140. Specifically, the statistics processor 150 accepts a statistics time period from the user and analyzes the execution states of the functions for each specified statistics time period.

For example, the statistics processor 150 takes statistics of the time-series address data measured by the plurality of nodes 210, 220, 230, ... , including calculation of total, average, maximum and minimum, thereby making it possible to evaluate the profiling result of the entire cluster system 200 with respect to time change. That is, it can be confirmed how the behavior of the program varies with time in the cluster system 200.

The analysis result display unit 160 displays the analysis result of the statistics processor 150 on the screen of the monitor 11.

The administration server 100 with such functions is capable of compiling the operating conditions of the cluster system 200 for each specified time period and analyzing parallelization effects. Next explanation is about a process of analyzing the operating conditions of the cluster system 200 with the configuration shown in FIG. 4.

Figure 5:
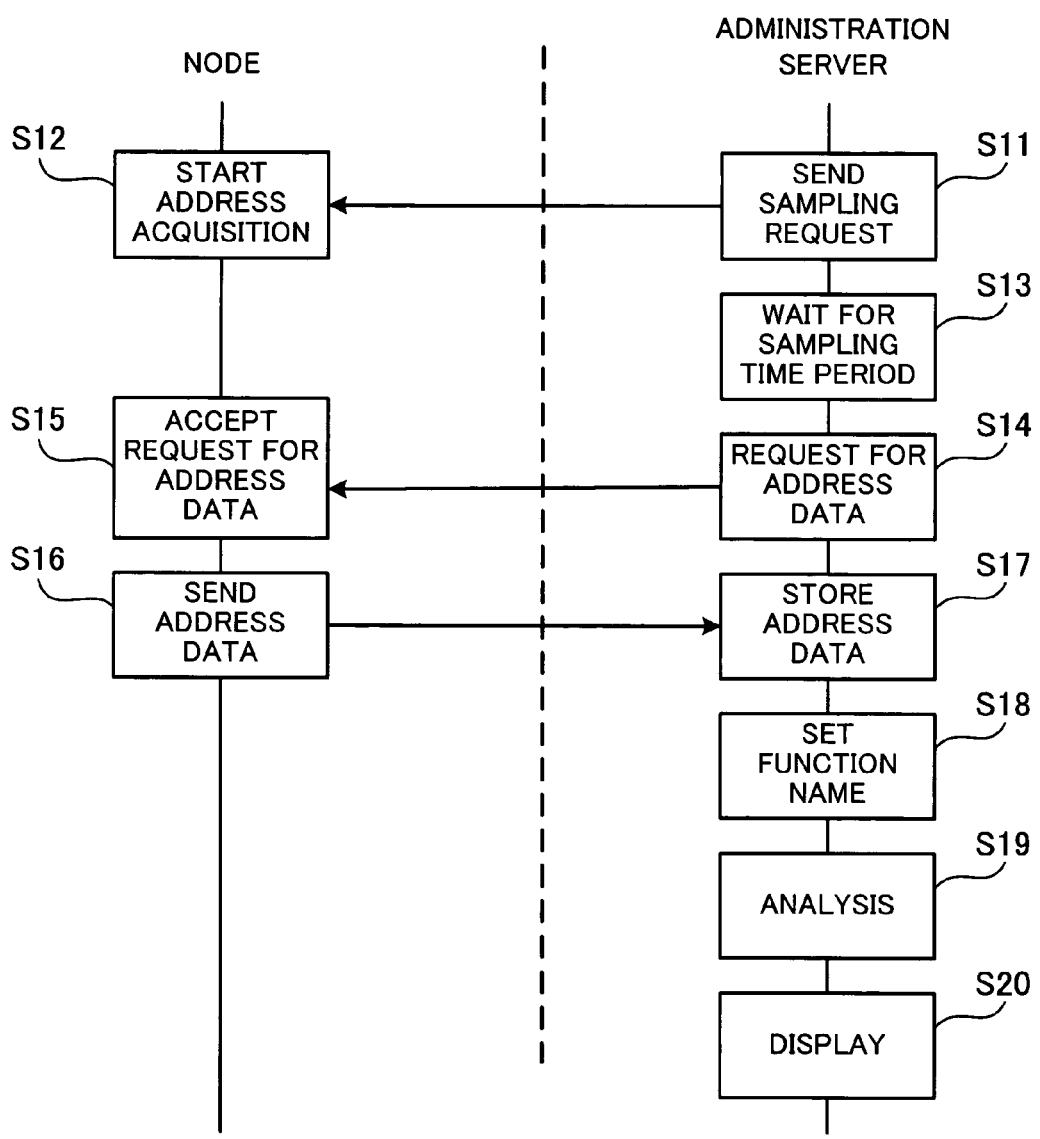
FIG. 5 is a sequence diagram showing how to analyze operating conditions.

FIG. 5 is a sequence diagram showing how to analyze operating conditions. This sequence will be described step by step.

[Step S11] The user makes and sends a request for collecting address data of the nodes 210, 220, 230, ... to the address data collector 110 of the administration server 100. The address data collector 110 then outputs a sampling request to each node 210, 220, 230, ... In this example, sampling at every 1 ms is requested.

[Step S12] Upon reception of the sampling request, the accessed address acquisition unit 211 of the node 210 starts to collect addresses being accessed by the CPU. The accessed address acquisition unit 211 stores the obtained addresses in the address data storage region 212 in association with its time information. The other nodes 220, 230, ... obtain addresses in the same manner. Addresses are acquired during a sampling time period specified by the sampling request.

[Step S13] The address data collector 110 waits for the sampling time period.

[Step S14] When the sampling time period has expired, the address data collector 110 requests each node 210, 220, 230, ... to provide address data.

[Step S15] The accessed address acquisition unit 211 of the node 210 accepts the address data request. The other nodes 220, 230, ... accept the address data request in the same manner.

[Step S16] The accessed address acquisition unit 211 of the node 210 receiving the address data request transmits the obtained address data to the administration server 100. The other nodes 220, 230, ... also transmit the address data to the administration server 100 in the same manner.

[Step S17] The address data collector 110 of the administration server 100 receives the address data from the nodes 210, 220, 230, ... Then the address data collector 110 stores the collected address data in the address record tables 141, 142, 143, ... of the time-series address memory 140.

[Step S18] Then the executed function detector 130 sets identification information of a function corresponding to each piece of address data of the address record tables 141, 142, 143, ... , for the address data.

[Step S19] The statistics processor 150 analyzes the address data and creates an analysis result in graph or the like.

[Step S20] The analysis result display unit 160 displays the analysis result of the statistics processor 150.

With the above procedure, the operation of the cluster system 200 is analyzed. The contents of the processes shown in FIG. 5 will be described in detail.

Figure 6:
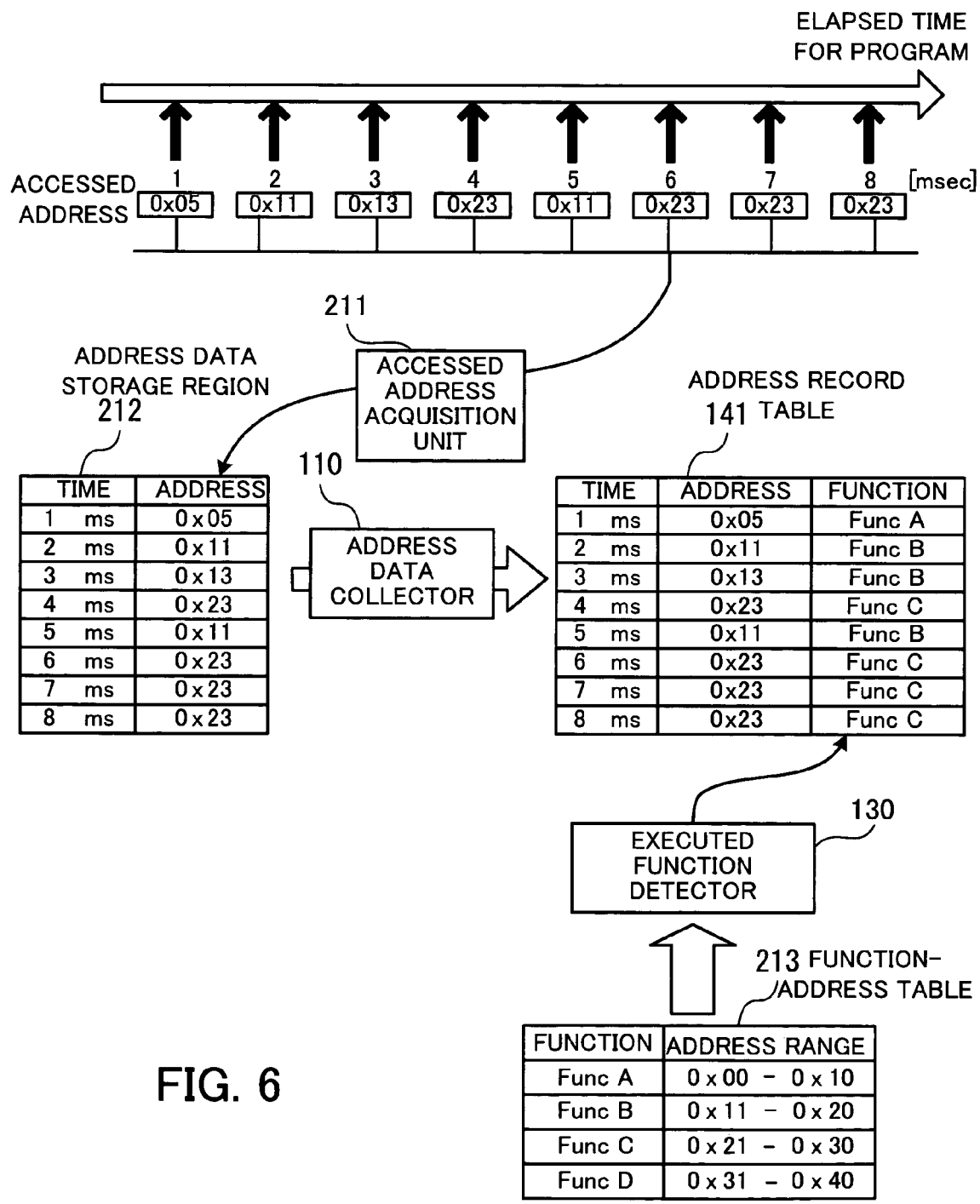
FIG. 6 shows how to set information in an address record table.

FIG. 6 shows how to set information in an address record table. As shown in FIG. 6, the node 210 performs sampling at every 1 ms, and records an address being accessed by the CPU at this time. The address data collector 110 collects and sets the recorded addresses and their time information in the address record table 141.

The address record table 141 has columns for time and address. The time column stores time information indicating times when addresses are obtained. The address column stores the addresses obtained. In this example, through 8 samplings at intervals of 1 ms, the addresses "0x5", "0x11", "0x13", "0x23", "0x11", "0x23", "0x23", "0x23" are obtained.

To the address record table 141, the executed function detector 130 adds function names. To do so, the executed function detector 130 searches the function-address table 213 for functions (which were executed when the CPU accessed addresses) corresponding to the addresses.

The function-address table 213 has columns for function name and address range. The function column contains functions that are executed by a node. The address range column contains ranges of addresses on memory space which are used by a program that executes the functions. For example, an address range for a function "Func A" is "0x00"-"0x10". It means that instructions are read out from addresses of "0x00"-"0x10" while the CPU executes the function "Func A".

It can be recognized from FIG. 6 that an accessed address of "0x05" was obtained and the function "Func A" was executed in sampling at 1 ms, an accessed address of "0x11" was obtained and the function "Func B" was executed in sampling at 2 ms, an accessed address of "0x13" was obtained and the function "Func B" was executed in sampling at 3 ms, an accessed address of "0x23" was obtained and the function "Func C" was executed in sampling at 4 ms, an accessed address of "0x11" was obtained and the function "Func B" was executed in sampling at 5 ms, and an accessed address of "0x23" was obtained and the function "Func C" was executed in sampling at 6 ms, 7 ms and 8 ms.

Recording of sampled addresses in time series enables the statistics processor 150 to perform data analysis for each specified time period. That is, analysis for each "specified time period" can be performed after measurement. For example, an entire program can be evaluated by dividing the program into four parts corresponding to the following four time periods (t is a sampling time).

1. 0 ms<t<=2 ms

In this time period, Func A: Func B: Func C: Func D=50%: 50%:0%:0%.

2. 2 ms<t<=5 ms

In this time period, Func A: Func B: Func C: Func D=0%: 50%:50%:0%.

3. 4 ms<t<=7 ms

In this time period, Func A: Func B: Func C: Func D=0%: 50%:50%:0%.

4. 6 ms<t<=8 ms

In this time period, Func A: Func B: Func C: Func D=0%: 0%:100%:0%.

Thus the breakdown of the run times of the functions in the program can be confirmed for each specified time period, thereby making it possible to specifically recognize changes in behavior while the program ran.

Although FIG. 6 shows only four functions for easy understanding, many functions are actually executed in the cluster system. Now an example of performing sampling at every 1 ms under conditions where n nodes (n is natural number) exist and N functions (N is natural number) are executed will be described.

Figure 7:
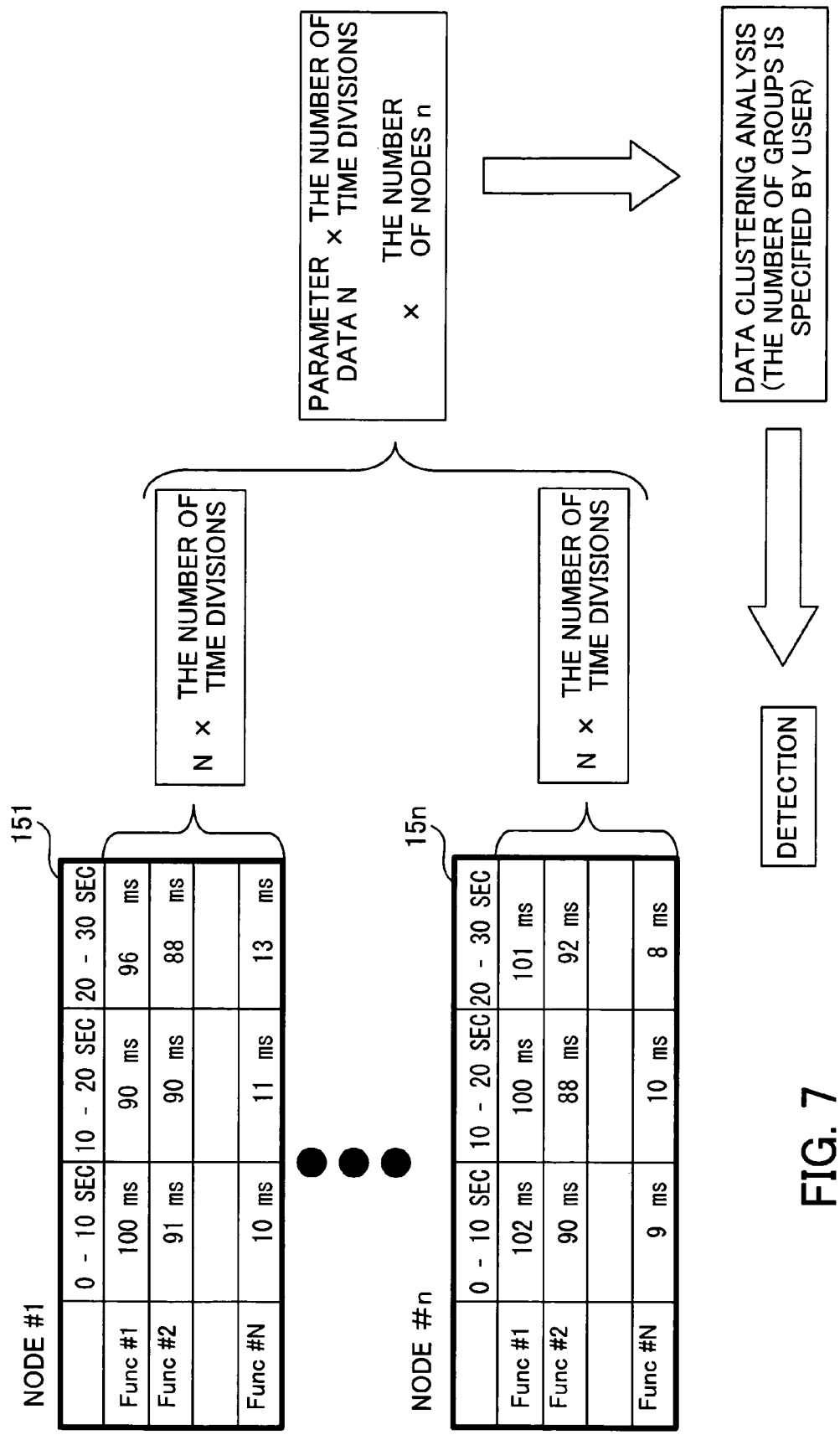
FIG. 7 shows an example of how a statistics processor analyzes data.

FIG. 7 shows an example of how the statistics processor analyzes data. The statistics processor 150 analyzes an address record table corresponding to each node and calculates the run time of each function for every 10 seconds. In this connection, the statistics processor 150 regards one-time acquisition of an address as executing a function corresponding to the address for 1 ms. Then the statistics processor 150 counts up the run time of each function for every 10 seconds for each node, and sets the counting results in counting result tables 151, . . . , 15n. For example, it can be recognized from the counting result table 151 that a node "node #1" executed a function "Func #1" for 100 ms within a time period of 0 to 10 seconds.

From each counting result table 151, . . . , 15n, data equivalent to N×the number of time divisions is obtained. Since n nodes exist, data equivalent to N×the number of time divisions×n is obtained. The obtained data is subjected to data clustering analysis.

The data clustering analysis is a data analysis technique to gather data having similar data structures into one group (cluster). The number of groups can be desirably specified by the user. The data clustering analysis technique includes a Complete technique. This technique is to select one piece of data from each of two clusters and obtain a distance between the data, and set the longest data distance as a distance between the two clusters. In this connection, a distance between data is small as data structures are similar.

Abnormal nodes can be detected through the above analysis. For example, if only one node executed the function "Func #2" for the longest time while most of the other nodes executed the function "Func #1" for the longest time, the one node can be recognized as being abnormal.

Further, in this embodiment, since obtained address data is collected, the number of time divisions for analysis can be desirably specified. By setting many time divisions, an analysis time period for counting up the run times of functions becomes short, resulting in being capable of detecting troubles occurring in a very short time.

Such abnormality detection process can be automated by using the statistics process (cluster analysis). The statistics processor 150 detects abnormality and the analysis result display unit 160 can report its details. At this time, change in behavior of the entire system can be reported in addition to the troubling time zone.

An example of the statistics process will be now described.

Figure 8:
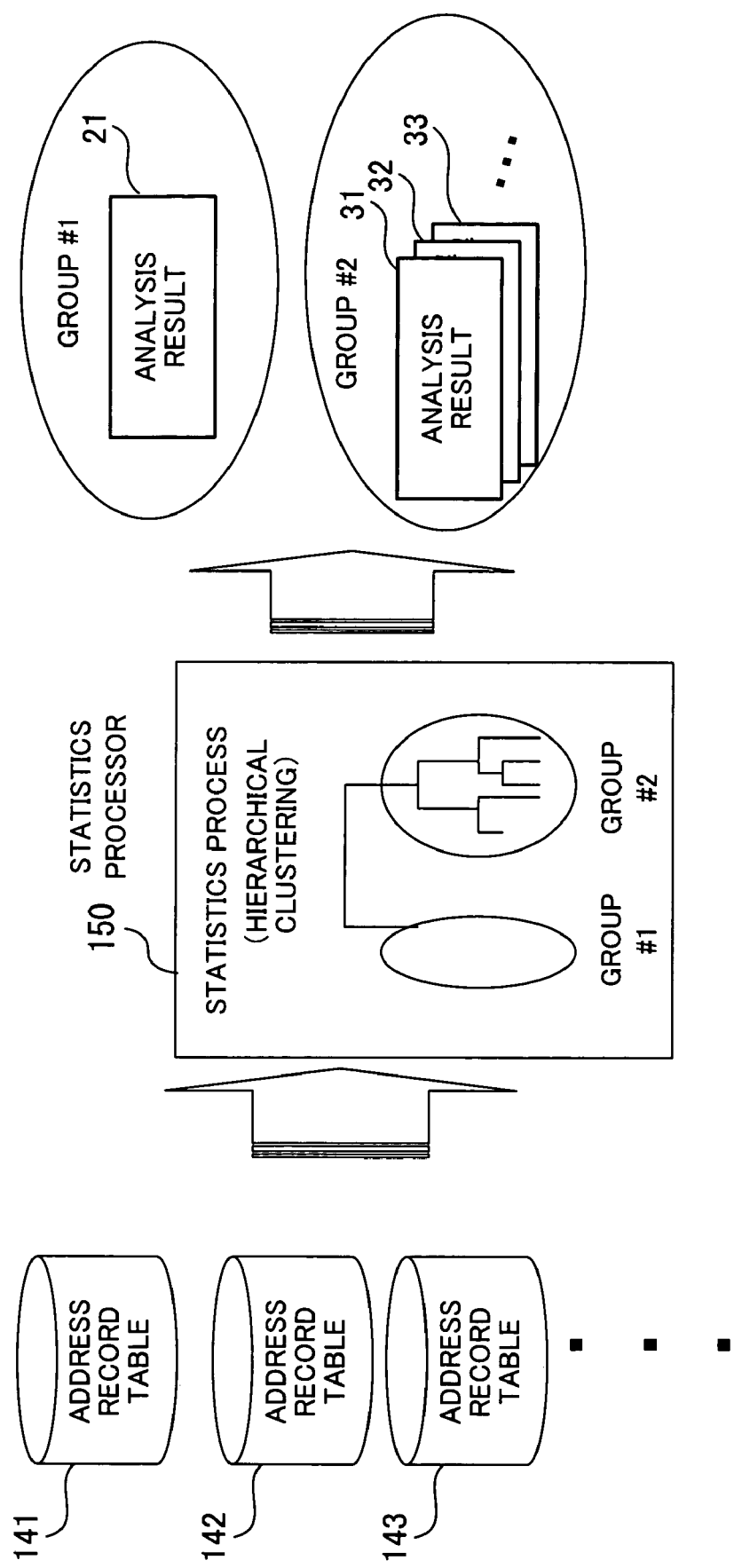
FIG. 8 shows an example of a statistics process using cluster analysis.

FIG. 8 shows an example of the statistics process using cluster analysis. Generally, applications which run on the cluster system 200 are technological applications. In this case, the nodes 210, 220, 230, . . . can be assumed to operate in a same way. In other words, a programs is optimized so that the nodes 210, 220, 230, . . . operate in the same way. Thus, it can be expected that obtained time-series data shows almost same results.

By using all the address record tables 141, 142, 143, . . . for the nodes 210, 220, 230, . . . , the statistics processor 150 performs the statistics process (cluster analysis). Thereby the behaviors of the nodes 210, 220, 230, . . . can be classified for each specified time period. FIG. 8 shows classification into two groups: "group #1" and group #2". Only one node belongs to "group #1" and the other nodes belong to "group #2". Therefore, the statistics process results in creating an analysis result 21 of the node of "group #1" and analysis results 31, 32, 33, . . . of the nodes of "group #2".

Figure 9:
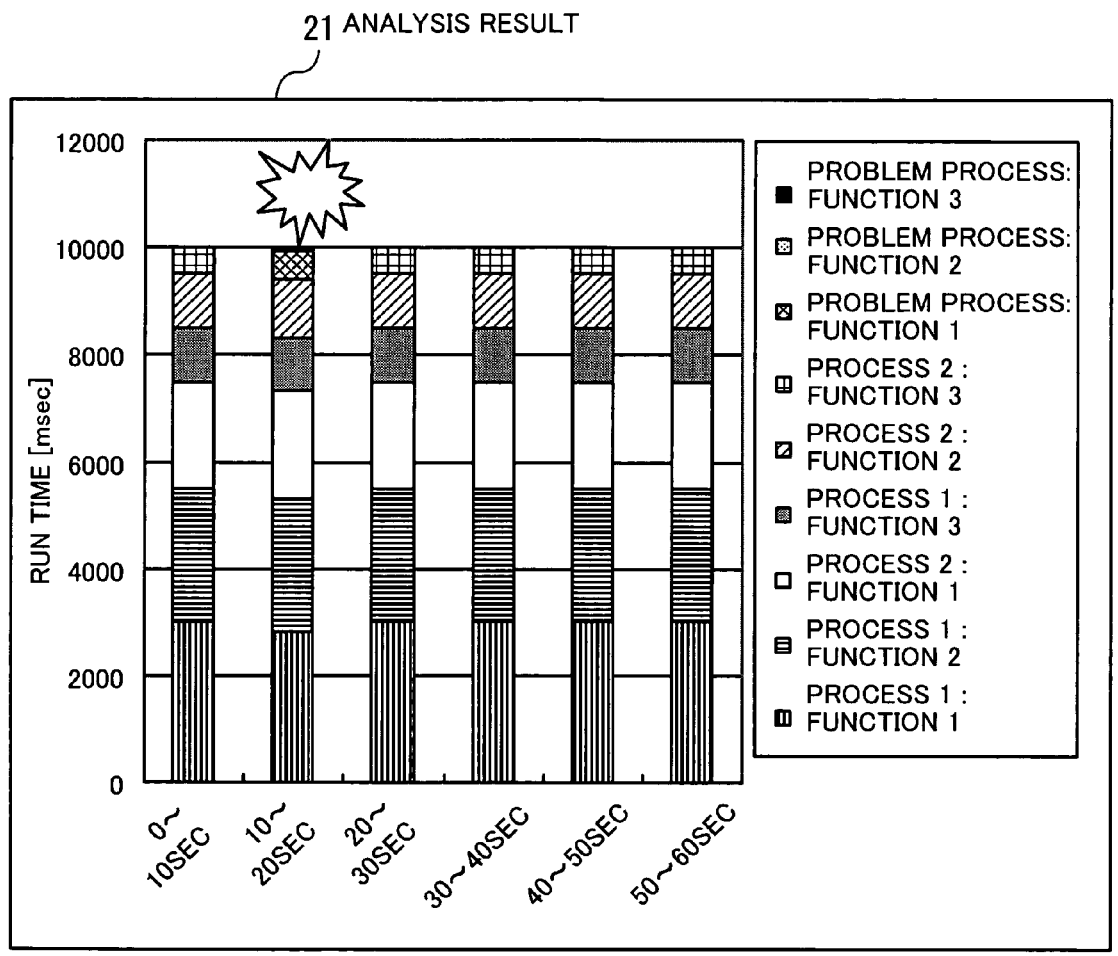
FIG. 9 shows an example of an analysis result of a node belonging to "group #1".

FIG. 9 shows an example of an analysis result of the node of the "group #1". This example analysis result 21 of the node belonging to "group #1" is obtained in a case where the counting process and the classification process are performed for each 10 seconds. The run times of the functions executed in the node are shown in graph.

By comparing the breakdown of the run times of the functions among the analysis time periods, it can be realized that different functions from the others were executed in a time period of 10 to 20 seconds. That is, if the processing performance of this node is not expected from design, the functions that were executed only in the time period of 10 to 20 seconds may be a problem.

In the graph of FIG. 9, different functions have different patterns. Alternatively, the different functions may be displayed in different colors.

In addition, unusual processes can be detected by comparing the breakdown of the run times of functions in a same time period among the groups.

Figure 10:
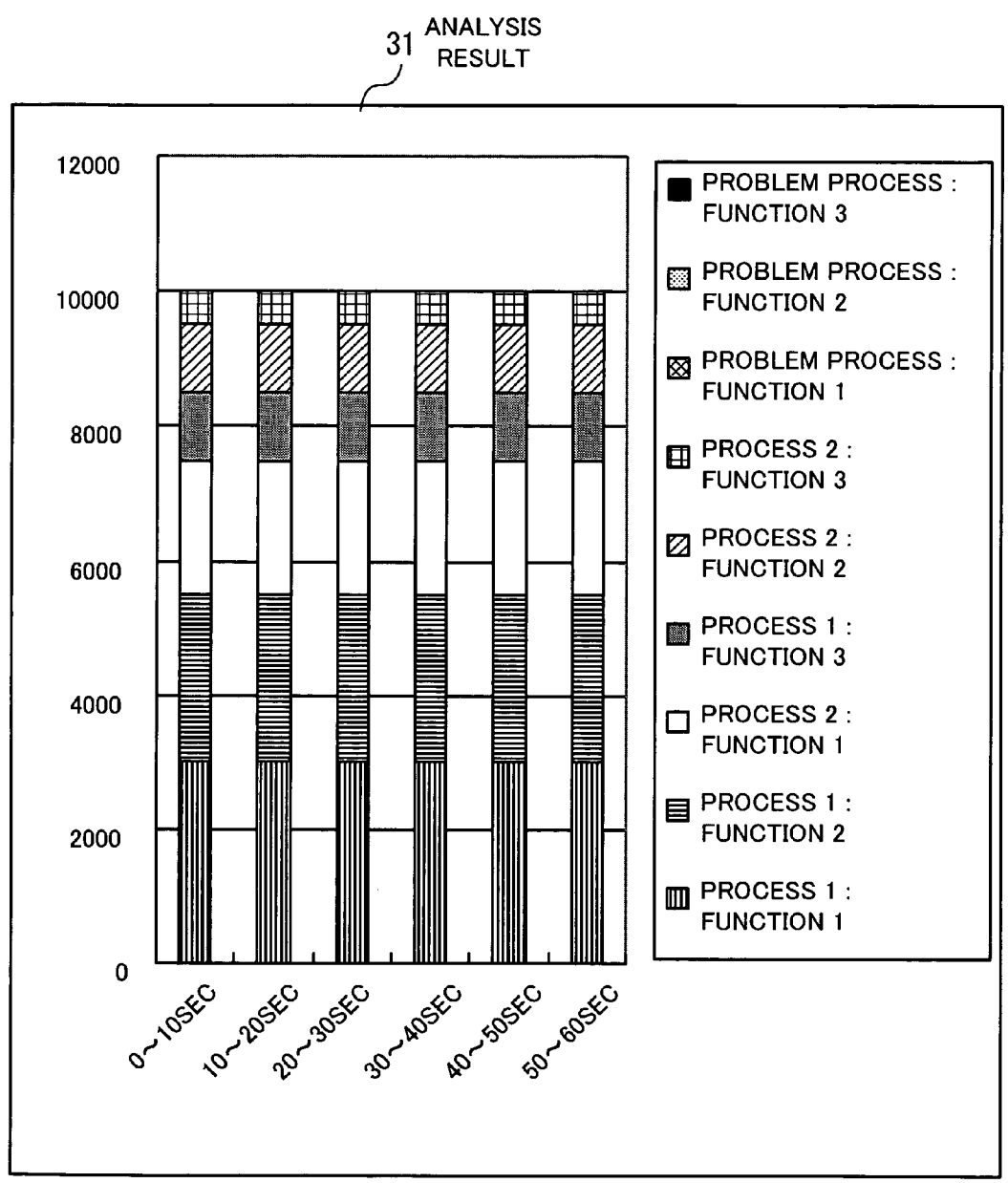
FIG. 10 shows an example of an analysis result of a node belonging to "group #2".

FIG. 10 shows an example of analysis results of the nodes of "group #2". This example is an analysis result 31 of a node belonging to the "group #2" in a case where the counting process and the classification process are performed for each 10 seconds. The analysis results 32, 33, . . . of the other nodes of the "group #2" have almost the same contents as the analysis result 31.

By comparing the analysis results 21 and 31 of FIGS. 9 and 10, only the node of "group #1" operates differently from the others. That is, it can be recognized from the analysis result 21 that the processes, "problem process: function 1" and "problem process: function 3", were executed in a time period of 10 to 20 seconds.

Based on hierarchically grouped data, run times can be counted up for each group. By testing an increased number of computers, groups (processing contents) having effective parallelization can be detected from such results. At this time, by means of visually different display for each group, such as coloring display, effectiveness of parallelization becomes easy to visually confirm.

For example, by analyzing operating conditions of different parallelization, from one node to eight nodes, to execute prescribed operation, effectiveness of the parallelization can be confirmed.

Figure 11:
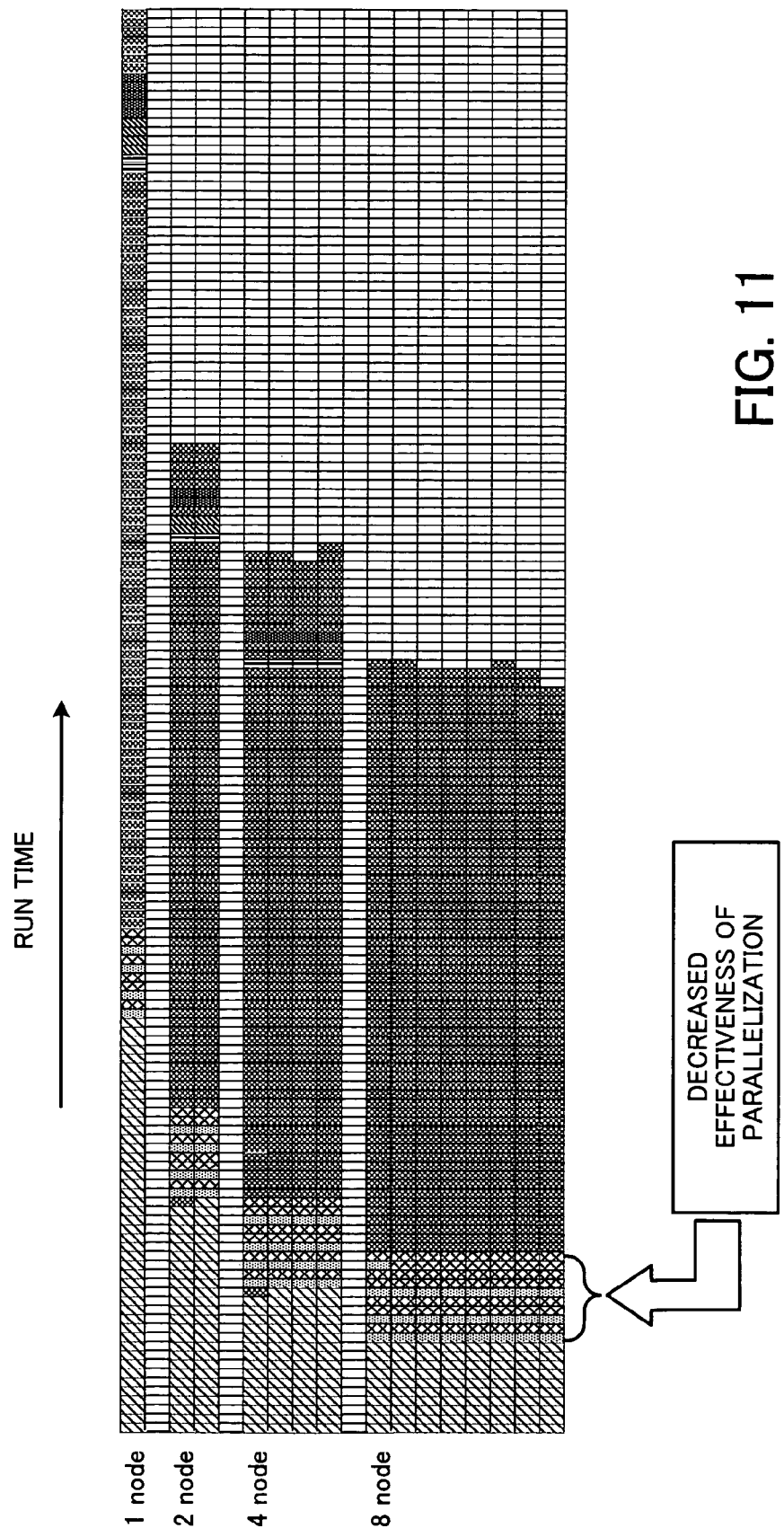
FIG. 11 is a graph showing difference in effectiveness of parallelism.

FIG. 11 is a graph for comparing effectiveness of parallelization. In FIG. 11, a horizontal axis indicates run time, and functions executed by nodes are displayed in different patterns. In this example, one block is equivalent to 5 seconds. As a result of analysis, a group of one node, a group of two nodes, a group of four nodes, and a group of eight nodes are created.

It can be known from this example of FIG. 11 that the group of one node and the group of eight nodes have no difference in the run times of the functions falling into a time period shown by an arrow. That is, parallelization is almost ineffective.

Grouping may be done according to processing contents (the breakdown of the run times of functions) in the cluster analysis.

Figure 12:
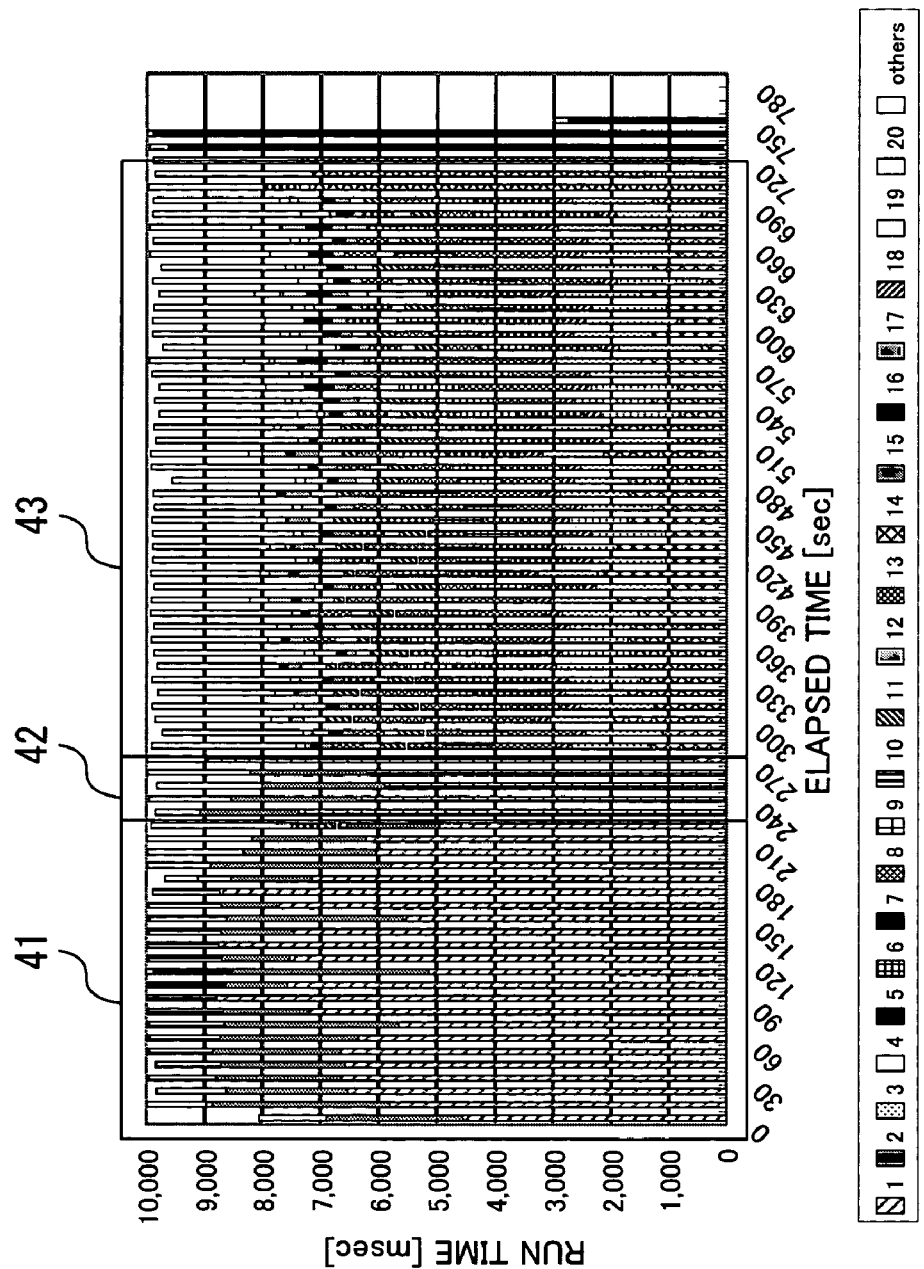
FIG. 12 shows how the processing activities vary with time.
Figure 13:
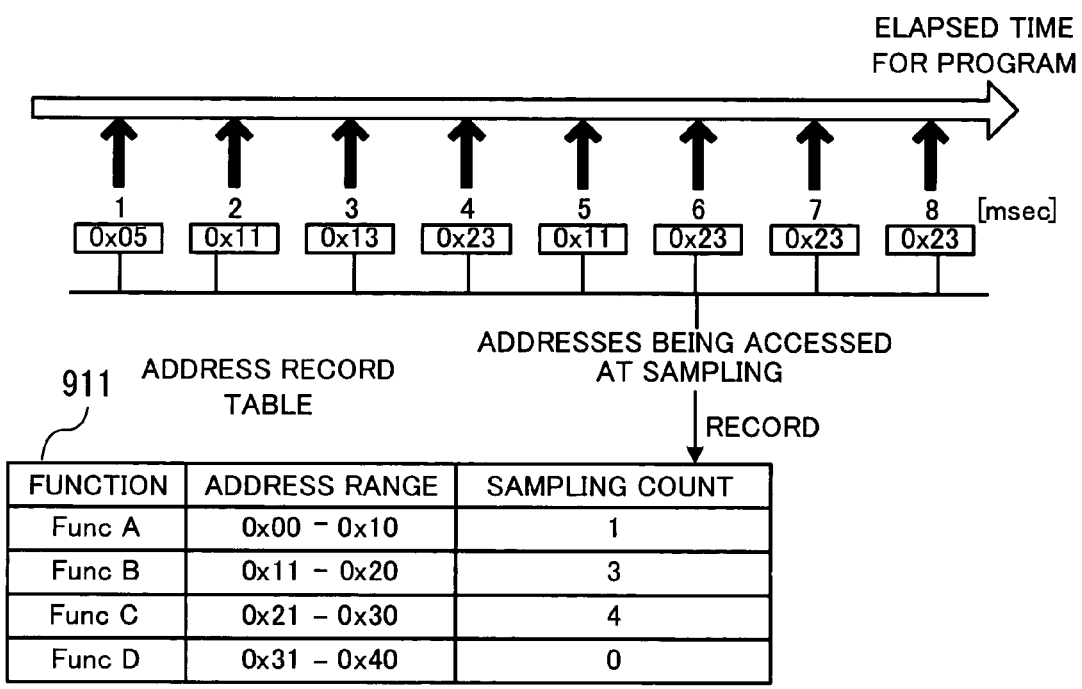
FIG. 13 shows a prior art method of profiling.

FIG. 12 shows how the processing activities vary with time. This figure is a bar chart, in which a horizontal axis indicates elapsed time (seconds), and shows processing activities during each period of 10 seconds. Each bar shows the run times of different functions with different hatch patterns. In addition, the rectangular frames indicate program groups 41, 42, and 43. In this example, the processing activities of the target program are classified into three kinds of activities.

The groups 41 to 43 of FIG. 12 comprise semantically different programs, such as "initial process", "calculation core", or "data collection process". Therefore, it can be easily determined which processes realize effective parallelization with increase in parallelization (the number of nodes).

As described above, the program profiling and the statistics process are combined in a parallel computing system comprising a great number of computing nodes. This enables prompt and automatic detection of performance bottlenecks and malfunctioning nodes, which are caused due to parallelization of a program. This can significantly reduce personal cost and time consumption required for performance evaluation and analysis.

That is, by using profiling data obtained once while a program runs, the breakdown of the run times of functions is calculated again for a certain time period (time-series profiling). Therefore, very small changes in behavior occurring in a specified short time can be confirmed. In addition, the run times of the functions in time-series profiling data are input as an explanatory parameter and then the cluster analysis is performed, thereby making it possible to confirm changes in the program contents of each node in view of a unit of processing which is semantically larger than a function level.

Further, time-series profiling data are compiled for each node or for all nodes, and the cluster analysis is performed with the calculated run times of functions as an explanatory parameter, thereby making it possible to automatically detect nodes performing similar processes and to significantly reduce an amount of data to be treated by an analyst. The explanatory parameter is a parameter for explaining a parameter (objective parameter) that should be predicted in the data analysis.

Furthermore, nodes are classified into groups in the cluster analysis, thereby making it possible to automatically detect nodes performing different programs out of a great number of computing nodes and their occurrence time periods. That is, if a group performing different programs from the others is detected by comparing the breakdown of the run times of functions among the groups, it can be recognized that the group has troubling nodes. In addition, if a time zone in which different functions from the others were executed is detected by comparing the breakdown of the run times of functions among analysis time periods, it can be recognized that the time zone includes troubling processes.

Furthermore, since groups are displayed in different colors, effectiveness of parallelization can be visually confirmed for each process when the number of nodes composing a cluster or a grid is changed.

The processing functions described above can be realized by a computer. In this case, a program is prepared, which describes processes for the functions to be performed by the administration server. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes, etc. The optical discs include Digital Versatile Discs (DVD), DVD-Random Access Memories (DVD-RAM), Compact Disc Read-Only Memories (CD-ROM), CD-R (Recordable)/RW (ReWritable), etc. The magneto-optical recording media include Magneto-Optical disks (MO) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

According to this invention, addresses being accessed by a CPU are obtained and stored in time series, so that changes in processes executed for each specified analysis time period can be analyzed. As a result, it is possible to detect a problem occurring in a very short time.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable storage medium encoded with instructions that, when executed on a computer, perform a method comprising:

sampling addresses being accessed by a central processing unit (CPU) at prescribed sampling intervals, and recording the sampled addresses and acquisition times thereof in an address record table in an order that the addresses are sampled;

searching a process-address table for a name of a process corresponding to each sampled address recorded in the address record table, and adding the name of the process to a corresponding entry of the address record table, the process-address table storing names of processes to be executed by the CPU and addresses to be specified during execution of the processes;

counting, in response to an analysis request specifying an analysis time period, occurrences of each process name in the address record table for each analysis time period specified, and summarizing executed processes for each analysis time period, based on a number of occurrences of each process name; and displaying results of said summarizing on a monitor screen.

2. The computer-readable storage medium according to claim 1, wherein the method further comprises creating a graph for comparing the executed processes for each analysis time period.

3. The computer-readable storage medium according to claim 1, wherein:

said sampling is performed in each of a plurality of nodes composing a parallel computing system; and the method further comprises;

creating a plurality of address record tables corresponding to the nodes, and collecting the addresses sampled at each of the plurality of nodes and storing the collected addresses in the address record tables corresponding to the nodes.

4. The computer-readable storage medium according to claim 3, wherein the method further comprises:

dividing the nodes into a plurality of groups comprising different numbers of nodes; and creating a graph for comparing run times of the processes among the different groups of nodes.

5. The computer-readable storage medium according to claim 3, wherein the method further comprises:

performing a statistics process on the plurality of nodes to classify the plurality of nodes into groups, and summarizing the executed processes for each analysis time period, for each group of nodes.

6. A system comprising:

address data storing means for sampling addresses being accessed by a central processing unit (CPU) at prescribed sampling intervals, and recording the sampled addresses and acquisition times thereof in an address record table in an order that the addresses are sampled;

executed process detection means for searching a process-address table for a name of a process corresponding to each sampled address recorded in the address record table, and adding the name of the process to a corresponding entry of the address record table, the process-address table storing names of processes to be executed by the CPU and addresses to be specified during execution of the processes;

analysis means for, in response to an analysis request specifying an analysis time period, counting occurrences each of process name in the address record table for each analysis time period specified, and summarizing executed processes for each analysis time period, based on a number of occurrences of each process name; and display means for displaying results of said summarizing on a monitor screen.

7. A system analysis method comprising:

sampling addresses being accessed by a central processing unit (CPU) at prescribed sampling intervals, and recording the sampled addresses and acquisition times thereof in an address record table in an order that the addresses are sampled;

searching a process-address table for a name of a process corresponding to each sampled address recorded in the address record table, and adding the name of the process to a corresponding entry of the address record table, the process-address table storing names of processes to be executed by the CPU and addresses to be specified during execution of the processes;

counting, in response to an analysis request specifying an analysis time period, occurrences of each process name in the address record table for each analysis time period specified, and summarizing executed processes for each analysis time period, based on a number of occurrences of each process name; and displaying results of said summarizing on a monitor screen of a computer.

* * * * *

UNITED STATES PATENT AND TRADEMARK OFFICE
CERTIFICATE OF CORRECTION

PATENT NO. : 7,472,039 B2
APPLICATION NO. : 11/497295
DATED : December 30, 2008
INVENTOR(S) : Shuji Yamamura et al.

It is certified that error appears in the above-identified patent and that said Letters Patent is hereby corrected as shown below:

IN THE CLAIMS

Claim 6, Col. 14, line 14, change "each of" to -- of each --.

Signed and Sealed this

Seventeenth Day of March, 2009

JOHN DOLL
*Acting Director of the United States Patent and Trademark Office*